United States Patent
Bi et al.

(10) Patent No.: US 10,142,003 B2
(45) Date of Patent: Nov. 27, 2018

(54) PRECODING INFORMATION OBTAINING APPARATUS, METHOD, AND SYSTEM

(71) Applicant: Huawei Technologies Co., Ltd., Shenzhen, Guangdong (CN)

(72) Inventors: Xiaoyan Bi, Shanghai (CN); Dageng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/481,845

(22) Filed: Apr. 7, 2017

(65) Prior Publication Data

US 2017/0214449 A1    Jul. 27, 2017

Related U.S. Application Data

(63) Continuation of application No. PCT/CN2014/088324, filed on Oct. 10, 2014.

(51) Int. Cl.
*H04B 7/02* (2018.01)
*H04L 1/02* (2006.01)
(Continued)

(52) U.S. Cl.
CPC ......... *H04B 7/0639* (2013.01); *H04B 7/0421* (2013.01); *H04B 7/0456* (2013.01);
(Continued)

(58) Field of Classification Search
CPC .................................................. H04B 7/0413
See application file for complete search history.

(56) References Cited

U.S. PATENT DOCUMENTS 6,633,679 B1 * 10/2003 Yfantis ............... G06T 9/007
382/240
2011/0310827 A1   12/2011 Srinivasa et al.
(Continued)

FOREIGN PATENT DOCUMENTS

CN      101136718 A    3/2008
CN      101146078 A    3/2008
(Continued)

OTHER PUBLICATIONS

3GPP TS 36.211 V12.3.0 (Sep. 2014), 3rd Generation Partnership Project; Technical Specification Group Radio Access Network; Evolved Universal Terrestrial Radio Access (E-UTRA); Physical channels and modulation (Release 12), 124 pages.
(Continued)

*Primary Examiner* — Shuwang Liu
*Assistant Examiner* — Gina McKie

(57) ABSTRACT

Embodiments of the present invention provide a precoding information obtaining apparatus. The apparatus includes: a determining module, configured to determine a transformation quantity according to a steering vector of an antenna form and a departure-angle range; a sending module, configured to send, to a terminal, information about the transformation quantity determined by the determining module, where the information about the transformation quantity is used by the terminal to determine a PMI according to the information about the transformation quantity, a codebook used for obtaining channel information, and a pilot measurement result; and a receiving module, configured to receive the PMI reported by the terminal. A network node sends a transformation quantity containing antenna information to a terminal, and the terminal feeds back a PMI according to the transformation quantity.

12 Claims, 5 Drawing Sheets

(51) Int. Cl.
  *H04B 7/06* (2006.01)
  *H04L 1/06* (2006.01)
  *H04B 7/0456* (2017.01)
  *H04B 7/0417* (2017.01)
  *H04L 25/02* (2006.01)

(52) U.S. Cl.
  CPC ......... *H04B 7/0617* (2013.01); *H04B 7/0626* (2013.01); *H04L 1/06* (2013.01); *H04L 25/0248* (2013.01)

(56) References Cited

U.S. PATENT DOCUMENTS

| | | | |
|---|---|---|---|
| 2013/0028341 A1* | 1/2013 | Ayach | H04B 7/0478 375/267 |
| 2013/0077705 A1 | 3/2013 | Thomas et al. | |
| 2013/0094547 A1 | 4/2013 | Kang et al. | |
| 2013/0279619 A1 | 10/2013 | Chen et al. | |
| 2013/0321207 A1* | 12/2013 | Monogioudis | H01Q 1/246 342/373 |
| 2014/0226702 A1* | 8/2014 | Onggosanusi | H04B 7/0469 375/219 |
| 2014/0301450 A1* | 10/2014 | Alshina | H04N 19/00078 375/240.03 |

FOREIGN PATENT DOCUMENTS

| | | |
|---|---|---|
| CN | 101969366 A | 2/2011 |
| CN | 103560985 A | 2/2014 |
| WO | 2011126341 A2 | 10/2011 |

OTHER PUBLICATIONS

Huawei, "Feedback of Long Term Channel Information for Adaptive Codebook", 3GPP TSG RAN WG1#60bis, Apr. 12-16, 2010, 6 pages, R1-101960.

Samsung, "Enhancements of Rel. 8 PMI feedback", 3GPP TSG RAN WG1 Meeting #59, Nov. 9-13, 2009, 7 pages, R1-094582.

* cited by examiner

PRECODING INFORMATION OBTAINING APPARATUS, METHOD, AND SYSTEM

CROSS-REFERENCE TO RELATED APPLICATIONS

This application is a continuation of International Application No. PCT/CN2014/088324, filed on Oct. 10, 2014, the disclosure of which is hereby incorporated by reference in its entirety.

TECHNICAL FIELD

Embodiments of the present invention relate to communications technologies, and in particular, to a precoding information obtaining method, apparatus, and system.

BACKGROUND

A multi-input multi-output (MIMO for short) technology is introduced in a Long Term Evolution (LTE for short) system and a Long Term Evolution Advanced (LTE-A for short) system, and the MIMO technology plays an important role in increasing a system throughput. In the MIMO technology, compared with an open-loop MIMO transmission scheme, a closed-loop MIMO transmission scheme can bring a larger capacity increase. The closed-loop MIMO transmission scheme refers to: A downlink is used as an example. A base station (BS for short) sends a measurement pilot. Then, after receiving the measurement pilot, a terminal enables, in an uplink feedback manner, the base station to obtain a characteristic of a downlink channel of each terminal, so as to select a precoding scheme that is more suitable for an instantaneous channel characteristic. In this process, the base station sends the measurement pilot, and a process in which after estimating the measurement pilot, the terminal enables, in the uplink feedback manner, the base station to obtain a channel characteristic is referred to as channel obtaining.

Currently, a type of channel obtaining method in a protocol standard of LTE or a protocol standard of LTE-A is as follows: First, during a development stage of the protocol standard, vectors that can quantize channel space are designed according to frequently-used antenna forms and permanently included in the protocol standard, and these vectors are referred to as a codebook; then, a base station sends a measurement pilot in actual communication, and a terminal in a cell measures the pilot to quantize an actual channel according to the codebook in the protocol and selects an optimal group of codebook indexes to be fed back to the base station. This channel obtaining method is referred to as a channel obtaining method based on codebook feedback.

Codebook design in a current protocol standard is designed based on an antenna with a specific form. However, ever-increasing maturation of a large-scale antenna technology and more complicated and diversified application scenario requirements of future 5G raise a new challenge to codebook design. First, future antenna forms are more diversified and extend from a conventional linear array to a planar array and even a spheroidal array. Second, different antenna beam coverage requirements appear because of diversity of application scenarios of future 5G. For example, in a coverage scenario of some skyscrapers, a base station needs to implement refined beam division in a vertical direction in a beam range. In some large-scale venues, a base station needs to implement refined beam division in a horizontal direction.

It is learned from the foregoing analysis that, an application requirement of future 5G poses a new challenge to a MIMO technology. However, a codebook designed based on a single antenna form in 3GPP specifications obviously cannot satisfy quantization of channel space in different antenna forms, and cannot meet requirements of different application scenarios.

SUMMARY

Embodiments of the present invention provide a precoding information obtaining apparatus, method, and system that can flexibly adapt to different antenna forms and application scenarios.

According to a first aspect, an embodiment of the present invention provides a precoding information obtaining apparatus, and the precoding information obtaining apparatus includes:

a determining module, configured to determine a transformation quantity according to a steering vector of an antenna form and a departure-angle range;

a sending module, configured to send, to a terminal, information about the transformation quantity determined by the determining module, where the information about the transformation quantity is used by the terminal to determine a precoding matrix indicator PMI according to the information about the transformation quantity, a codebook used for obtaining channel information, and a pilot measurement result; and a receiving module, configured to receive the PMI reported by the terminal.

According to a second aspect, an embodiment of the present invention provides a precoding information feedback apparatus, and the precoding information feedback apparatus includes:

a receiving module, configured to receive information about a transformation quantity, where the transformation quantity is determined according to a steering vector of an antenna form and a departure-angle range;

an obtaining module, configured to obtain a precoding matrix indicator PMI according to the information about the transformation quantity that is received by the receiving module, a codebook used for obtaining channel information, and a pilot measurement result; and a sending module, configured to feed back the PMI obtained by the obtaining module to a network node.

According to a third aspect, an embodiment of the present invention provides a precoding information obtaining method, and the precoding information obtaining method includes:

determining a transformation quantity according to a steering vector of an antenna form and a departure-angle range;

sending information about the transformation quantity to a terminal, where the information about the transformation quantity is used by the terminal to determine a precoding matrix indicator PMI according to the information about the transformation quantity, a codebook used for obtaining channel information, and a pilot measurement result; and receiving the PMI reported by the terminal.

According to a fourth aspect, an embodiment of the present invention provides a precoding information feedback method, and the precoding information feedback method includes:

receiving information about a transformation quantity, where the transformation quantity is determined according to a steering vector of an antenna form and a departure-angle range;

obtaining a precoding matrix indicator PMI according to the information about the transformation quantity, a codebook used for obtaining channel information, and a pilot measurement result; and feeding back the PMI to a network node.

According to a fifth aspect, an embodiment of the present invention provides a precoding information obtaining system, and the precoding information obtaining system includes:

a network node, configured to: determine a transformation quantity according to a steering vector of an antenna form and a departure-angle range; send information about the transformation quantity to a terminal, where the information about the transformation quantity is used by the terminal to determine a precoding matrix indicator PMI according to the information about the transformation quantity, a codebook used for obtaining channel information, and a pilot measurement result; and receive the PMI reported by the terminal; and the terminal, configured to: receive the information about the transformation quantity, where the transformation quantity is determined according to the steering vector of the antenna form and the departure-angle range; obtain the precoding matrix indicator PMI according to the information about the transformation quantity, the codebook used for obtaining channel information, and the pilot measurement result; and feed back the PMI to the network node.

In the embodiments of the present invention, a transformation quantity is determined according to a steering vector of an antenna form and a departure-angle range. That is, related information about the antenna form and the departure angle are transformed into a form of the transformation quantity to be sent to a terminal. Therefore, the terminal can obtain the related information and obtain and feed back precoding information according to the related information, so that a base station more fully and flexibly obtains channel information to adapt to different antenna forms and departure-angle application scenarios.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a precoding information obtaining apparatus, method, and system that can flexibly adapt to requirements of different antenna forms and departure-angle application scenarios and accurately obtain channel information. For ease of understanding, relevant concepts such as a network node, an antenna form, an application scenario, and a codebook used for obtaining channel information related to the present invention are described as follows:

The network node in the embodiments of the present invention may be an AP (Access Point) of Wi-Fi, or a BTS (base transceiver station) in GSM (Global System for Mobile communication) or CDMA (Code Division Multiple Access), or may be an NB (NodeB) in WCDMA (Wideband Code Division Multiple Access), or may be an eNB or an eNodeB (evolved NodeB) in LTE, or a relay station or an access point, or another device in a future 5G network, or the like.

A terminal in the embodiments of the present invention may be a subscriber unit, a subscriber station, a mobile station, a remote station, a remote terminal, a mobile device, a user terminal, a wireless communications device, a user agent, a cellular phone, a cordless phone, a SIP (Session Initiation Protocol) phone, a WLL (wireless local loop) station, a PDA (personal digital assistant), a handheld device having a wireless communication function, an in-vehicle device, a wearable device, a computing device, or another processing device connected to a wireless modem.

Figure 1:
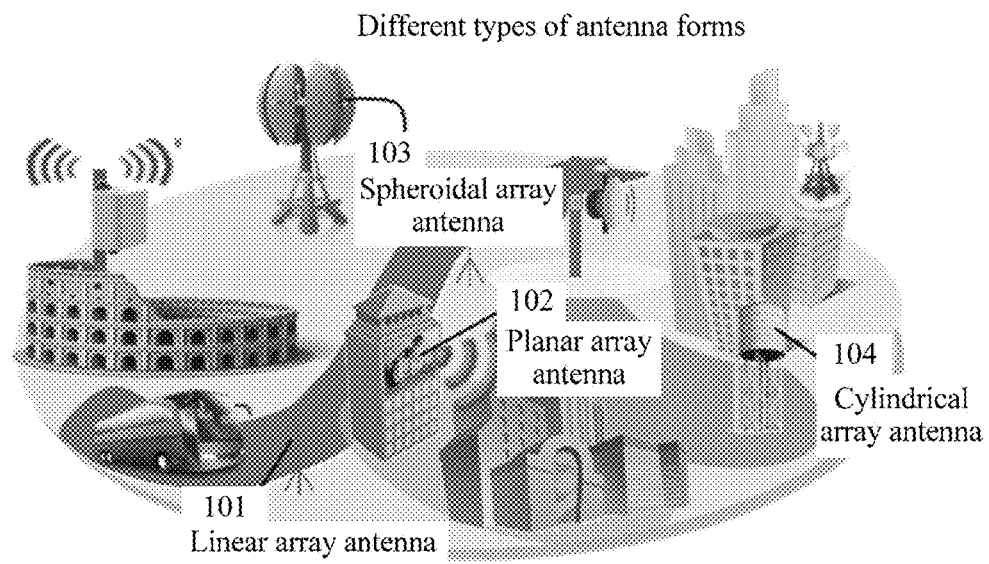
FIG. 1 is a schematic diagram of different types of antenna forms.

The antenna form in the embodiments of the present invention includes but is not limited to: different types of antenna forms shown in FIG. 1, for example, a linear array antenna 101, a planar array antenna 102, a spheroidal array antenna 103, and a cylindrical array antenna 104. Array element spacings of an antenna array may be uniform or may be non-uniform.

Figure 2:
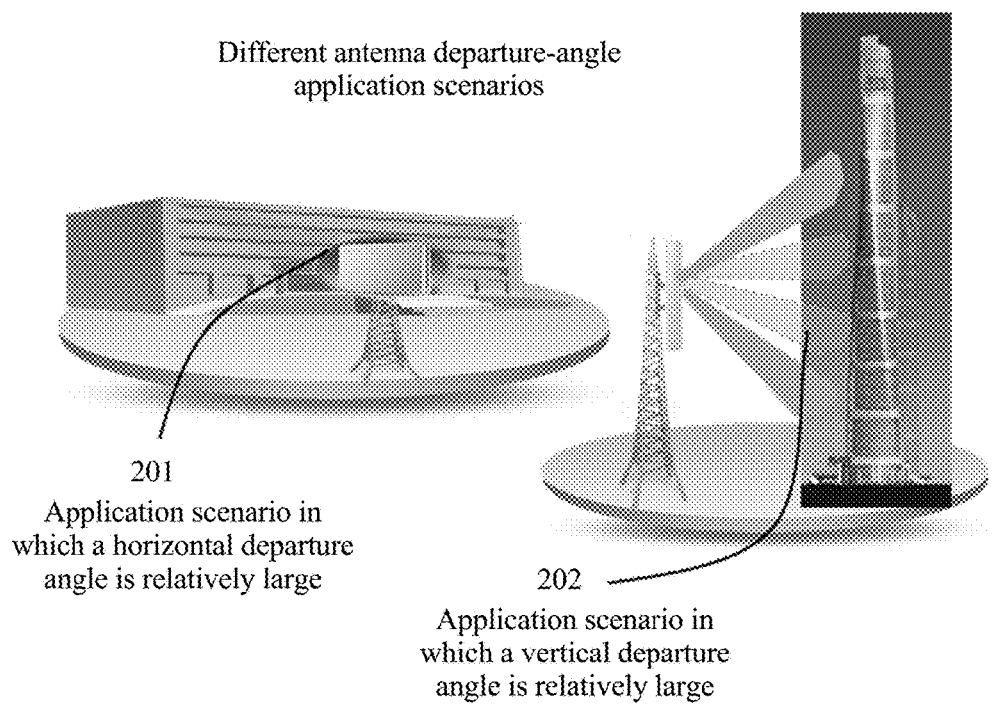
FIG. 2 is a schematic diagram of different antenna departure-angle application scenarios.

The application scenario in the embodiments of the present invention includes but is not limited to different antenna departure-angle application scenarios shown in FIG. 2. For example, an application scenario 201 in which a horizontal departure angle is relatively large and an application scenario 202 in which a vertical departure angle is relatively large.

The codebook used for obtaining channel information in the embodiments of the present invention refers to a group of vectors that are designed based on common antenna forms to quantize channel space and are permanently included in a standard protocol. For example, as shown in Table 1, Table 1 is a 4-antenna codebook in Table 6.3.4.2.3-2 in 3GPP specifications 36.211 V8.3.0. The codebook is designed based on a 4-antenna uniform linear array (ULA for short) whose array element spacing is λ/2. The codebook is designed according to quantization of channel space in a ULA co-polar antenna form, and is particularly suitable for quantizing the channel space in this antenna form.

TABLE 1

Codebook for antenna ports {0, 1, 2, 3}

| Codebook index | $u_n$ | Number of layers u | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Figure 3:
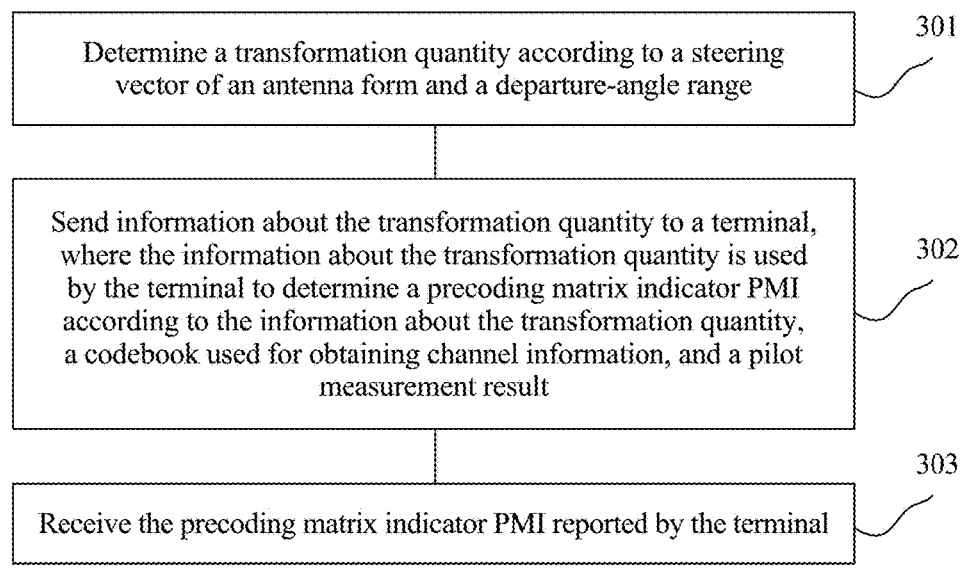
FIG. 3 is a schematic diagram of a precoding information obtaining method according to an embodiment of the present invention.

FIG. 3 is a schematic diagram of a precoding information obtaining method according to an embodiment of the present invention. As shown in FIG. 3, the precoding information obtaining method includes the following steps.

Step 301: Determine a transformation quantity according to a steering vector of an antenna form and a departure-angle range.

Specifically, a network node generates a transformation quantity of the network node according to a steering vector of an antenna form and a departure-angle range of the network node.

Further, a transformation quantity that maximizes an antenna gain is determined according to the steering vector of the antenna form and the departure-angle range, or a transformation quantity that minimizes an antenna-gain fluctuation range is determined according to the steering vector of the antenna form and the departure-angle range. That is, the transformation quantity satisfies a requirement for maximizing the antenna gain of the network node, or the transformation quantity satisfies a requirement for minimizing the antenna-gain fluctuation range of the network node.

Specifically, the transformation quantity of the network node is a transformation matrix T or another quantity that can represent the steering vector of the antenna form and the departure-angle range of the network node.

For a steering vector $a(\theta)$ of a given antenna form and a given departure-angle range $\theta_m$, an antenna gain is:

$$\max_{i \in \{1,2,...N\}} |p_i^T T a(\theta)|^2,$$

where $p_i \in [p_1, p_2, \ldots p_N]$ is a vector in a codebook used for obtaining channel information, $[p_1, p_2, \ldots p_N]$ is the codebook used for obtaining channel information, for example, $u_n$ in Table 1, N is a quantity of vectors in the codebook used for obtaining channel information, and $p_i^T$ is transpose of $p_i$; $T \in C^{M \times M}$, and $C^{M \times M}$ is a complex matrix whose row quantity and column quantity are M; $a(\theta) \in C^{M \times 1}$, $a(\theta)$ is the steering vector of the antenna form, $C^{M \times 1}$ is a complex matrix whose row quantity is M and column quantity is 1, and M is a quantity of port numbers of the codebook used for obtaining channel information; $\theta_m = (\phi_m, \varphi_m)$ is the departure-angle range that includes a horizontal departure-angle range $\varphi_m$ and a vertical departure-angle range $\phi_m$, for example, the horizontal departure-angle range $\varphi_m$ is [−15°, 60°], and $\theta \in \theta_m$ in $a(\theta)$.

Figure 4:
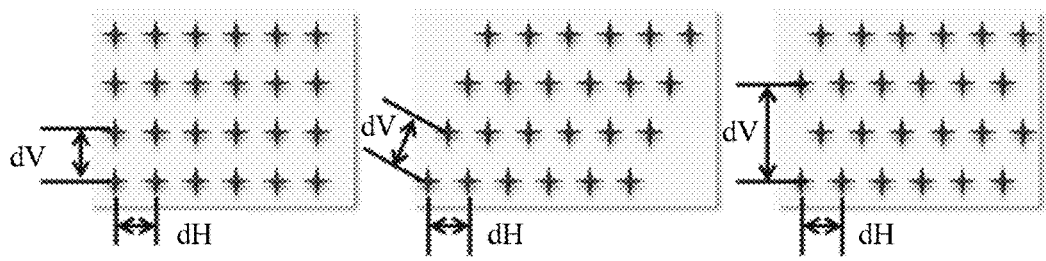
FIG. 4 is a schematic diagram of several common arrangement manners of a planar antenna array.

An array antenna form includes an arrangement manner of an antenna array, an array element spacing of the antenna array, a reference array element location, and the like. The arrangement manner of the antenna array may be a linear array, a ring array, a rectangular array, a grid array, or the like. For example, some common arrangement manners of a planar antenna array are shown in FIG. 4. An array element spacing of the planar antenna array refers to an array element spacing in a horizontal direction, an array element spacing in a vertical direction, or the like. In FIG. 4, dH is an array element spacing in the horizontal direction, and dV is an array element spacing in the vertical direction.

A steering vector is decided by an array antenna form, and represents a phase delay of a plane wave in a group of array elements, and a phase may be any angle.

For example, one array antenna has Q array elements. A position vector of the $q^{th}$ array element is $r_q = (x_q, y_q, z_q)$, where q is a positive integer from 1 to Q, $x_q$, $y_q$, and $z_q$ are position coordinates of the $q^{th}$ array element, the position coordinates may represent an array element arrangement manner, and $r_q^T$ is transpose of $r_q$. A steering vector $a(\theta)$ of the antenna array is a Q×1 complex vector, and may be represented as:

$$a(\theta) = (1 e^{-jr_2^T k} \ldots e^{-jr_Q^T k}),$$

where k is a wave-number vector, the wave-number vector k represents a phase-change vector of a plane wave in an x direction, a y direction, and a z direction, the x direction, the y direction, and the z direction are three mutually perpendicular directions, and an amplitude of k is a wave number $$\frac{2\pi}{\lambda};$$

and for a specific direction ($\phi,\varphi$), a wave-number vector is:

$$k = (k_x \quad k_y \quad k_z) = \frac{2\pi}{\lambda}(\sin\phi\cos\varphi, \sin\phi\sin\varphi, \cos\phi),$$

where $\phi$ is an angle between the specific direction and an xz plane, $\varphi$ is an angle between the specific direction and an xy plane, the xz plane is a plane formed by the x direction and the z direction, and the xy plane is a plane formed by the x direction and the y direction.

Optionally, a method for determining a transformation matrix T of a network node according to a steering vector of an antenna form and a departure-angle range of the network node, that is, a method for determining a transformation matrix T that maximizes an antenna gain includes:

obtaining the transformation matrix T according to $$\hat{T} = \arg\max_T J(T);$$

where a value of T is $\hat{T}$, $\hat{T}$ is an estimate value of T, T satisfies an equation $T^H T = I$, $T^H$ is a Hermite matrix of T, and I is a unit matrix; and obtaining J(T) according to $$J: C^{M \times M} \to R \quad J(T) = \sum_{\theta \in \theta_m} \max_{i \in \{1,2,\ldots N\}} |p_i^T T a(\theta)|^2;$$

where T is an M×M complex matrix $C^{M \times M}$, J(T) is a function of T, and a value of J(T) is a real number R; $J: C^{M \times M} \to R$ indicates that T in J(T) is the M×M complex matrix $C^{M \times M}$, J(T) is a real part of a value obtained according to the formula $$\sum_{\theta \in \theta_m} \max_{i \in \{1,2,\ldots N\}} |p_i^T T a(\theta)|^2,$$

M is a quantity of port numbers of a codebook used for obtaining channel information, $p_i \in [p_1, p_2, \ldots p_N]$ is a vector in the codebook used for obtaining channel information, $[p_1, p_2, \ldots p_N]$ is the codebook used for obtaining channel information, $p_i^T$ is transpose of $p_i$, i is any positive integer from 1 to N, N is a quantity of vectors in the codebook used for obtaining channel information, $a(\theta)$ is a steering vector of an antenna form, $\theta_m$ is a departure-angle range, and $\theta \in \theta$ in $a(\theta)$.

Specifically, the transformation matrix T is designed to maximize an antenna gain according to a steering vector $a(\theta)$ of a given antenna form and a departure-angle range $\theta_m$, and the antenna gain is:

$$\max_{i \in \{1,2,\ldots N\}} |p_i^T T a(\theta)|^2.$$

For example, a gradient descent algorithm is used to maximize the antenna gain:

$$J: C^{M \times M} \to R \quad J(T) = \sum_{\theta \in \theta_m} \max_{i \in \{1,2,\ldots N\}} |p_i^T T a(\theta)|^2,$$

where T is an M×M complex matrix $C^{M \times M}$, J(T) is a function of T, and a value of J(T) is a real number R; and the transformation matrix T satisfies an equation $$\hat{T} = \arg\max_T J(T);$$

where a value of T is $\hat{T}$, $\hat{T}$ is an estimate value of T, T satisfies an equation $T^H T = I$, $T^H$ is a Hermite matrix of T, and I is a unit matrix.

Further, that a gradient descent algorithm is used to maximize the antenna gain includes:

S1. Initialize: l=0, and it is assumed that $T_0$ is a unit matrix or a sparse unitary matrix.

S2. Calculate a gradient $\nabla J(T_l)$.

S3. Calculate $T_{l+1} = T_l + \mu \nabla J(T_l)$ and make $T_{l+1}$ be a unitary matrix.

S4. Calculate $J(T_{l+1})$ and $J(T_l)$. If $J(T_{l+1})$ is greater than $J(T_l)$ and a maximum iteration quantity is not reached, increase l by 1, go to step S2, and continue to perform calculation until convergence; or otherwise, go to step S1, initialize $T_0$ to a matrix different from the matrix obtained in previous initialization, and perform calculation to calculate until convergence.

$\nabla J(T)$ is a gradient of J(T), $$\nabla J(T) = \frac{1}{|\theta_m|} \sum_{\theta \in \theta_m} p_i^* p_i^T T a(\theta) a^H(\theta),$$

where $p_i^*$ is conjugation of $p_i$, $p_i^T$ is transpose of $p_i$, and $a^H(\theta)$ is conjugate transpose of $a(\theta)$.

$$T_{l+1} = T_l + \mu \nabla J(T_l),$$

where $\mu$ is a step length of $\nabla J(T_l)$ and is a preset value, l is a quantity of iterations, and l is a positive integer.

Optionally, another method for determining a transformation matrix T of a network node according to a steering vector of an antenna form and a departure-angle range of the network node, that is, a method for determining a transformation matrix T that minimizes an antenna-gain fluctuation range includes:

obtaining the transformation matrix T according to $$\hat{T} = \arg\max_T J(T);$$

where a value of T is $\hat{T}$, $\hat{T}$ is an estimate value of T, T satisfies an equation $T^H T = I$, $T^H$ is a Hermite matrix of T, and I is a unit matrix; and obtaining J(T) according to $$J: C^{M \times M} \to R \ J(T) = \min \left[ \frac{\max\limits_{\theta \in \theta_m} \left( \max\limits_{i \in \{1,2,\ldots N\}} |p_i^T T a(\theta)|^2 \right)}{\min\limits_{\theta \in \theta_m} \left( \max\limits_{i \in \{1,2,\ldots N\}} |p_i^T T a(\theta)|^2 \right)} \right];$$

where T is an M×M complex matrix $C^{M \times M}$, J(T) is a function of T, and a value of J(T) is a real number R; $J: C^{M \times M} \to R$ indicates that T in J(T) is the M×M complex matrix $C^{M \times M}$, J(T) is a real part of a value obtained according to a formula $$\sum_{\theta \in \theta_m} \max_{i \in \{1,2,\ldots N\}} |p_i^T T a(\theta)|^2,$$

M is a quantity of port numbers of a codebook used for obtaining channel information, $p_i \in [p_1, p_2, \ldots p_N]$ is a vector in the codebook used for obtaining channel information, $[p_1, p_2, \ldots p_N]$ is the codebook used for obtaining channel information, $p_i^T$ is transpose of $p_i$, i is any positive integer from 1 to N, N is a quantity of vectors in the codebook used for obtaining channel information, $a(\theta)$ is a steering vector of an antenna form, $\theta_m$ is a departure-angle range, and $\theta \in \theta_m$ in $a(\theta)$.

Specifically, the matrix T is designed to minimize an antenna-gain fluctuation range in a given antenna form $a(\theta)$ and a given departure-angle range $\theta_m$, and the antenna-gain fluctuation range is:

$$\frac{\max\limits_{\theta \in \theta_m} \left( \max\limits_{i \in \{1,2,\ldots N\}} |p_i^T T a(\theta)|^2 \right)}{\min\limits_{\theta \in \theta_m} \left( \max\limits_{i \in \{1,2,\ldots N\}} |p_i^T T a(\theta)|^2 \right)}.$$

A gradient descent algorithm is used to minimize the antenna-gain fluctuation range:

$$J: C^{M \times M} \to R \ J(T) = \min \left[ \frac{\max\limits_{\theta \in \theta_m} \left( \max\limits_{i \in \{1,2,\ldots N\}} |p_i^T T a(\theta)|^2 \right)}{\min\limits_{\theta \in \theta_m} \left( \max\limits_{i \in \{1,2,\ldots N\}} |p_i^T T a(\theta)|^2 \right)} \right],$$

where T is an M×M complex matrix $C^{M \times M}$, J(T) is a function of T, and a value of J(T) is a real number R; and the transformation matrix T satisfies an equation $$\hat{T} = \arg\max_T J(T);$$

where $\hat{T}$ is an estimate value of T, a value of T may be solved $\hat{T}$, $T^H T = I$, $T^H$ is a Hermite matrix of the transformation matrix T, and I is unit matrix.

In a specific implementation process for solving the transformation matrix T, a method similar to the foregoing gradient iterative method may be used or another optimal value solving method may be used.

Step 302: Send information about the transformation quantity to a terminal, where the information about the transformation quantity is used by the terminal to determine a PMI according to the information about the transformation quantity, a codebook used for obtaining channel information, and a pilot measurement result.

Specifically, the transformation quantity of the network node is a transformation matrix T. A system information block is sent to the terminal, and the system information block carries information about the transformation matrix T. That is, the information about the transformation matrix T is carried by using the system information block, and the system information block is sent to the terminal.

A definition of a system information block (SIB for short) in an existing protocol is used. A newly added SIB in the present invention is defined as SIB14. Information about a transformation matrix T is encapsulated in SIB14, and then SIB14 is sent to a terminal by using a broadcast signal or radio resource control signaling.

SIB14 includes related information about the transformation matrix, and the related information is related to a feedback mode based on a codebook. The feedback mode is well known in existing LTE and LTE-A protocols. For details, refer to descriptions in 3GPP specifications 36.331 6.3.1. SIB14 includes an element carrying specific transformation matrix parameters. A specific definition is as follows:

Optionally, SIB14 includes the following parameters:

horizontal transformation matrix indicator: used to indicate whether there is a transformation matrix in a horizontal direction; for example, the horizontal transformation matrix indicator is 1-bit information, and when the horizontal transformation matrix indicator is 1, it indicates that there is a transformation matrix in the horizontal direction, or otherwise, it indicates that there is no transformation matrix in the horizontal direction;

horizontal transformation matrix dimension: used to indicate a dimension of the transformation matrix in the horizontal direction;

horizontal transformation matrix nonzero quantity: used to indicate a quantity of nonzero elements of the transformation matrix in the horizontal direction; and horizontal transformation matrix element: used to indicate a value of the nonzero element of the transformation matrix in the horizontal direction and including a row index of the nonzero element in the transformation matrix in the horizontal direction, a column index of the nonzero element in the transformation matrix in the horizontal direction, a real part of the nonzero element in the transformation matrix in the horizontal direction, and an imaginary part of the nonzero element in the transformation matrix in the horizontal direction.

Optionally, SIB14 includes the following parameters:

vertical transformation matrix indicator: used to indicate whether there is a transformation matrix in a vertical direction; for example, the vertical transformation matrix indicator is 1-bit information, and when the vertical transformation matrix indicator is 1, it indicates that there is a transformation matrix in the vertical direction, or otherwise, it indicates that there is no transformation matrix in the vertical direction;

vertical transformation matrix dimension: used to indicate a dimension of the transformation matrix in the vertical direction;

vertical transformation matrix nonzero quantity: used to indicate a quantity of nonzero elements of the transformation matrix in the vertical direction; and vertical transformation matrix element: used to indicate a value of the nonzero element of the transformation matrix in the vertical direction and including a row index of the nonzero element in the transformation matrix in the vertical direction, a column index of the nonzero element in the transformation matrix in the vertical direction, a real part of the nonzero element in the transformation matrix in the vertical direction, and an imaginary part of the nonzero element in the transformation matrix in the vertical direction.

Optionally, the nonzero element of the transformation matrix is a complex number with an amplitude of 1. Further, all nonzero elements of transformation matrices mentioned in the horizontal transformation matrix element value and the vertical transformation matrix element value are complex numbers with an amplitude of 1. When amplitudes of all the nonzero elements are 1, a quantity of information that is of the transformation matrix and that needs to be delivered by a channel is decreased, and only a phase of each complex number needs to be delivered. In this way, system resources can be greatly saved, and system communications efficiency can be improved.

Further, specific names of the parameters included in SIB14 may be other names, provided that the other names indicate same or similar functions.

In addition, for a transformation matrix in a horizontal direction and a transformation matrix in a vertical direction, as shown in FIG. 2, when a transformation matrix T is generated, the transformation matrix in the horizontal direction or the transformation matrix in the vertical direction is generated according to actual requirements. Specifically, it is assumed that a departure-angle range in the vertical direction is zero, and the transformation matrix in the horizontal direction is obtained. It is assumed that a departure-angle range in the horizontal direction is zero, and the transformation matrix in the vertical direction is obtained.

For example, for a 4-antenna uniform circular array (UCA for short) with 0.94λ, when only a horizontal departure angle is considered, a transformation matrix $T_{example}$ generated based on a codebook used for obtaining channel information in the 3GPP specifications 36.211 V8.3.0 and the solution of the present invention is as follows:

$$T_{example} = \begin{bmatrix} 0 & 0 & 0 & e^{-j0.3111} \\ e^{j0.6581} & 0 & 0 & 0 \\ 0 & 0 & e^{j1.4298} & 0 \\ 0 & e^{j2.4356} & 0 & 0 \end{bmatrix}.$$

For $T_{example}$ elements, in corresponding SIB14, carrying specific transformation matrix parameters are as follows:

horizontal transformation matrix indicator: 1, indicating that $T_{example}$ has a transformation matrix in a horizontal direction;

horizontal transformation matrix dimension: 4, indicating that a dimension of the transformation matrix of $T_{example}$ in the horizontal direction is 4;

horizontal transformation matrix nonzero quantity: 4, indicating that a quantity of nonzero elements of the transformation matrix of $T_{example}$ in the horizontal direction is 4; and horizontal transformation matrix element:

$$\begin{bmatrix} 2 & 1 & 0.7912 & 0.6116 \\ 4 & 2 & -0.7610 & 0.6488 \\ 3 & 3 & 0.1405 & 0.9901 \\ 1 & 4 & 0.9520 & -0.3061 \end{bmatrix},$$

where the first column indicates that nonzero elements in $T_{example}$ are in the $2^{nd}$, the $4^{th}$, the $3^{rd}$, and the $1^{st}$ rows in $T_{example}$, the second column indicates that nonzero elements in $T_{example}$ that are corresponding to the first column are in the $1^{st}$, the $2^{nd}$, the $3^{rd}$, and the $4^{th}$ columns in $T_{example}$, the third column indicates real parts of values of the nonzero elements in $T_{example}$ that are corresponding to the first column, and the fourth column indicates imaginary parts of the values of the nonzero elements in $T_{example}$ that are corresponding to the first column.

Optionally, for $T_{example}$, elements, in corresponding SIB14, carrying specific transformation matrix parameters are as follows:

vertical transformation matrix indicator: 0, indicating that $T_{example}$ has no transformation matrix in a vertical direction;

vertical transformation matrix dimension: 0;

vertical transformation matrix nonzero quantity: 0; and vertical transformation matrix element value: 0.

Further, horizontal transformation matrix elements may be transmitted by column. That is, the horizontal transformation matrix elements may be transmitted according to a sequence from top to bottom of the first column, and then the second column to the last column successively. Similarly, the horizontal transformation matrix element may be transmitted by row. That is, the horizontal transformation matrix element may be transmitted according to a sequence from left to right of the first row, and then the second row to the last row successively. A similar method may also be used in transmitting vertical transformation matrix element.

Figure 5:
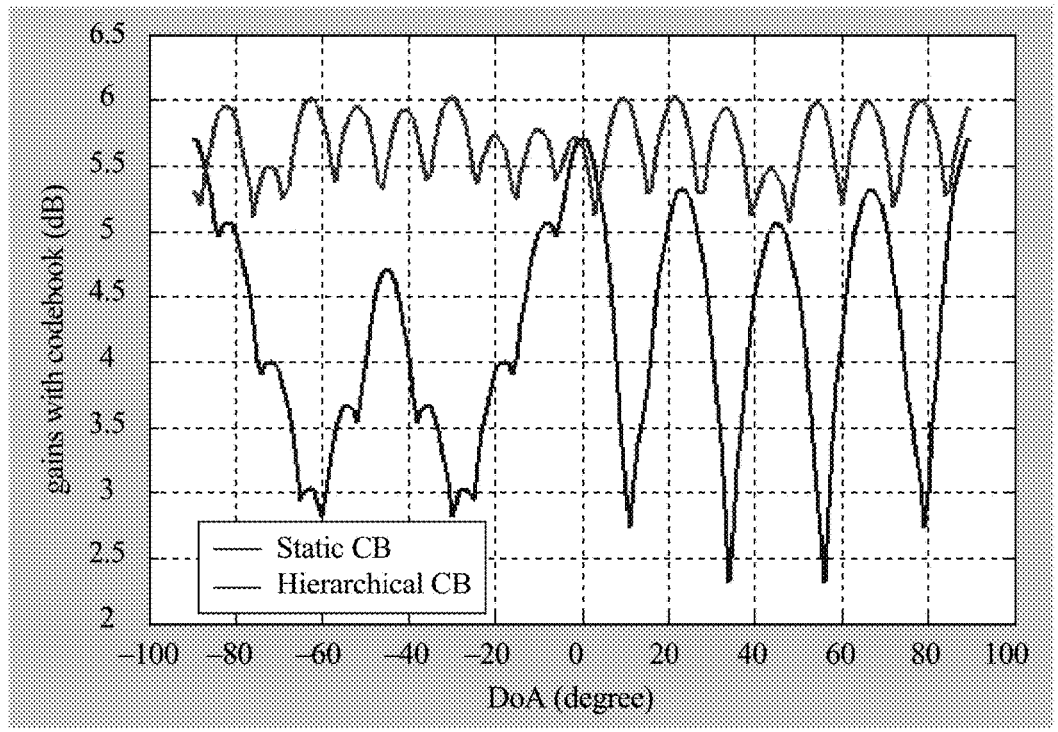
FIG. 5 is an effect diagram of an obtained codebook gain according to an embodiment of the present invention.

$T_{example}$ is used as an example in the foregoing. With reference to a departure-angle range [−90°,90°] in a horizontal direction, there is only a transformation matrix in the horizontal direction, and an obtained codebook gain is shown in FIG. 5. It may be learned from the figure that the solution provided in the present invention can implement that the 4-antenna UCA of 0.94λ has a gain fluctuation of only 0.7 dB, and gain stability is greatly improved.

$T_{example}$ is a transformation matrix in a horizontal direction that is obtained according to step 301, that is, a transformation matrix obtained when only a horizontal departure angle is considered. This also means that a departure-angle range $\theta_m$ includes a horizontal departure-angle range $\phi_m$ and a vertical departure-angle range $\varphi_m$, and the vertical departure-angle range $\varphi_m$ is zero. Similarly, a transformation matrix in a vertical direction may be obtained according to step 301, that is, a transformation matrix obtained when only a vertical departure angle is considered. A departure-angle range $\theta_m$ includes the horizontal departure-angle range $\phi_m$ and the vertical departure-angle range $\varphi_m$, and the horizontal departure-angle range $\phi_m$ is zero. Similarly, when a horizontal departure-angle range $\phi_m$ and a vertical departure-angle range $\varphi_m$ that are included in a departure-angle range $\theta_m$ of a network node are not zero, a transformation matrix of this network node in the horizontal direction may be obtained by making the vertical departure-angle range $\varphi_m$ zero, and a transformation matrix of this network node in the vertical direction may be obtained by making the horizontal departure-angle range $\phi_m$ zero. Further, both the transformation matrix in the horizontal direction and the transformation matrix in the vertical direction are encapsulated in SIB14 to be sent to a terminal.

In addition, the horizontal in this embodiment of the present invention may be indicated as horizon or transverse, and horizontal in English. The vertical in this embodiment of the present invention may be indicated as perpendicular or upright or elevation, and vertical or elevation in English.

Further, a system information block that carries all or some information about a transformation matrix T is sent to a terminal by using a broadcast channel or radio resource control signaling.

Further, a network node further sends a channel measurement pilot to a terminal, and the channel measurement pilot is used to measure a characteristic of a channel between the network node and the terminal.

Step 303: Receive the precoding matrix indicator PMI reported by the terminal.

Specifically, the precoding matrix indicator (PMI for short) is generated according to the information about the transformation quantity, the codebook used for obtaining channel information, and the pilot measurement result.

Related information about an antenna form and a departure angle of a network node is transformed into a transformation quantity, and information about the transformation quantity is sent to a terminal by using a system information block. The terminal may obtain the related information about the antenna form and the departure angle, and obtain and feed back precoding information according to the related information, so that the network node more fully and flexibly obtains channel information to adapt to different antenna forms and departure-angle application scenarios.

Figure 6:
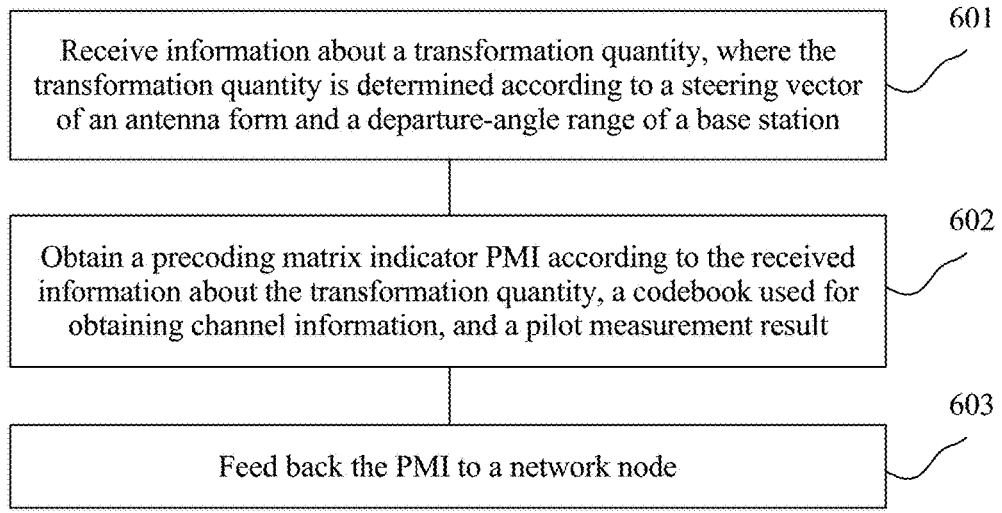
FIG. 6 is a schematic diagram of a precoding information feedback method according to an embodiment of the present invention.

FIG. 6 is a schematic diagram of a precoding information feedback method according to an embodiment of the present invention. As shown in FIG. 6, the precoding information feedback method includes the following steps.

Step 601: Receive information about a transformation quantity, where the transformation quantity is determined according to a steering vector of an antenna form and a departure-angle range.

Specifically, the information about the transformation quantity sent by a network node is received, the transformation quantity is generated according to the steering vector of the antenna form and the departure-angle range of the network node, and the transformation quantity satisfies a requirement for maximizing an antenna gain of the network node or the transformation quantity satisfies a requirement for minimizing an antenna-gain fluctuation range of the network node.

Specifically, the transformation quantity of the network node is a transformation matrix T or another quantity that can represent the steering vector of the antenna form and the departure-angle range of the network node. Further, a terminal receives a system information block, and the system information block carries information about the transformation matrix.

Specifically, a method for determining the transformation matrix T is similar to the method in step 301. A definition of the system information block is similar to the definition of SIB14 in step 302. Details are not described herein.

Further, the terminal further receives a channel measurement pilot from the network node, and obtains a channel characteristic matrix H according to the channel measurement pilot, and H may be obtained by using a channel measurement method in the prior art.

Step 602: Obtain a precoding matrix indicator PMI according to the information about the transformation quantity, a codebook used for obtaining channel information, and a pilot measurement result.

Specifically, the terminal obtains the PMI according to the information about the transformation matrix T.

Optionally, a method for obtaining the PMI includes the following steps:

Step 01: Obtain a channel characteristic matrix H of a downlink channel according to a pilot measurement result, that is, a terminal measures a channel measurement pilot of a network node and obtains the channel characteristic matrix H of the downlink channel.

Step 02: The terminal performs quantization according to H, a transformation matrix T, and a codebook $p_i \in [p_1, p_2, \ldots p_N]$ used for obtaining channel information, that is, according to a calculation formula $$\arg\max_{i \in \{1,2,\ldots N\}} \{|HT^T p_i|^2\},$$

searches for $p_i$ that can maximize a value of the formula.

Step 03: An index value of $p_i$ that is found in step 02 is the PMI.

Optionally, another method for obtaining the PMI includes the following steps:

Step 11: Obtain a channel characteristic matrix H of a downlink channel according to a pilot measurement result, that is, a terminal measures a channel measurement pilot of a network node and obtains the channel characteristic matrix H of the downlink channel. Perform singular value decomposition (SVD for short) on H to obtain first n eigenvectors $\{V_j\}_{j=1,\ldots,n}$, where j is any positive integer from 1 to N, and n is a positive integer.

Step 12: The terminal performs quantization according to $\{V_j\}_{j=1,\ldots,n}$, a transformation matrix T, and a codebook $p_i \in [p_1, p_2, \ldots p_N]$ used for obtaining channel information. For each $V_j$, calculate the following formula $$\arg\max_{i \in \{1,2,\ldots N\}} \{|V_j T^T p_i|^2\},$$

that is, according to each $V_j$, search for $p_i$ that can maximize a value of the foregoing formula to obtain n $p_i$.

Step 13: Index values of n $p_i$ found in step 12 are PMIs.

A network node can fully obtain a channel characteristic after obtaining a PMI, and perform more pertinent communication according to the channel characteristic, so as to improve communication reliability and increase a system capacity.

Step 603: Feed back the PMI to a network node.

The PMI obtained in step 602 is fed back to the network node. Specifically, for one PMI found in step 03 in step 602, the PMI is fed back to the network node. For the index values of n $P_i$ found in step 13 in step 602, that is, the PMIs, in this case, because n $P_i$ have n index values, there are n PMIs, and all the n PMIs are fed back.

Precoding information is fed back to a network node. The precoding information is obtained according to a transformation quantity transformed from related information about an antenna form and a departure angle, so that the network node more fully and flexibly obtains channel information to adapt to different antenna forms and departure-angle application scenarios.

In addition, step 301 to step 303 and step 601 to step 603 may be repeatedly performed according to event triggering or periodic triggering. For example, the method in this embodiment of the present invention is triggered according to an interference status between a network node and a terminal or a preset time interval, so that a transformation quantity and a PMI can be dynamically updated.

Figure 7:
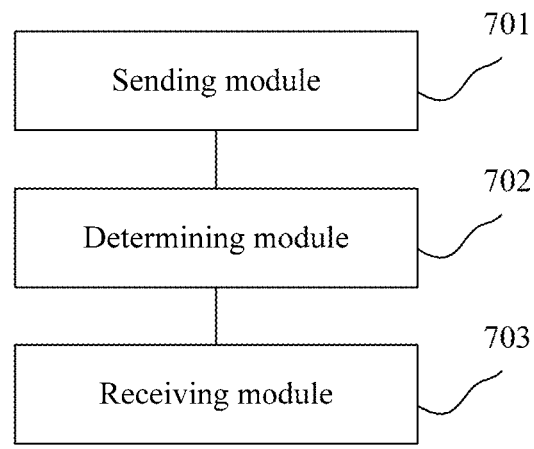
FIG. 7 is a schematic diagram of a precoding information obtaining apparatus according to an embodiment of the present invention.

Corresponding to the foregoing method embodiment, an embodiment of the present invention further provides a precoding information obtaining apparatus. Referring to FIG. 7, the apparatus includes:

a determining module 702, configured to determine a transformation quantity according to a steering vector of an antenna form and a departure-angle range;

a sending module 701, configured to send, to a terminal, information about the transformation quantity determined by the determining module 702, where the information about the transformation quantity is used by the terminal to determine a PMI according to the information about the transformation quantity, a codebook used for obtaining channel information, and a pilot measurement result; and a receiving module 703, configured to receive the PMI reported by the terminal.

Some related technical features, for example, a steering vector of an antenna form, a departure-angle range, a transformation quantity, a PMI, a system information block, a transformation matrix, and the like, are similar or corresponding to some technical features related in the foregoing method embodiment. Descriptions are not repeated any longer in this embodiment.

Figure 8:
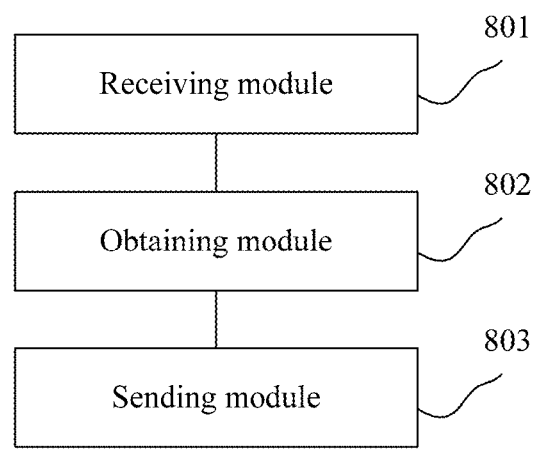
FIG. 8 is a schematic diagram of a precoding information feedback apparatus according to an embodiment of the present invention.

Corresponding to the foregoing method embodiment, an embodiment of the present invention further provides a precoding information feedback apparatus. Referring to FIG. 8, the apparatus includes:

a receiving module 801, configured to receive information about a transformation quantity, where the transformation quantity is determined according to a steering vector of an antenna form and a departure-angle range;

an obtaining module 802, configured to obtain a precoding matrix indicator PMI according to the information about the transformation quantity that is received by the receiving module 801, a codebook used for obtaining channel information, and a pilot measurement result; and a sending module 803, configured to feed back the PMI obtained by the obtaining module 802 to a network node.

Some related technical features, for example, a steering vector of an antenna form, a departure-angle range, a transformation quantity, a PMI, a system information block, a transformation matrix, and the like, are similar or corresponding to some technical features related in the foregoing method embodiment. Descriptions are not repeated any longer in this embodiment.

Figure 9:
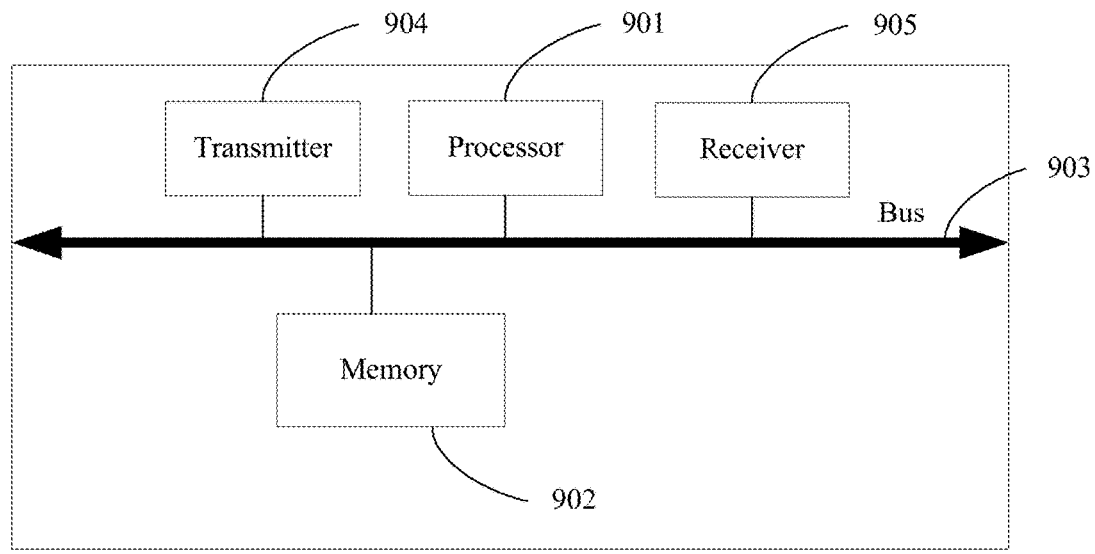
FIG. 9 is a schematic diagram of a precoding information obtaining apparatus according to an embodiment of the present invention.

An embodiment of the present invention provides a precoding information obtaining apparatus. Referring to FIG. 9, the apparatus includes: a processor 901, a memory 902, a transmitter 904, a receiver 905, and a bus 903. The processor 901, the memory 902, the transmitter 904, and the receiver 905 are connected by using the bus 903 to perform data transmission. The memory 902 is configured to store data processed by the processor 901.

The bus 903 may be an industry standard architecture (ISA for short) bus, a peripheral component interconnect (PCI for short) bus, or an extended industry standard architecture (EISA for short) bus, or the like. This is not limited herein. The bus 903 may be classified into an address bus, a data bus, a control bus, and the like. For ease of illustration, only one bold line is used in FIG. 9 to represent the bus. However, this does not mean that there is only one bus or only one type of bus.

The memory 902 is configured to store data or executable program code, where the program code includes a computer operation instruction, and may be specifically an operating system, an application program, and the like. The memory 902 may include a high-speed RAM memory, and may further include a non-volatile memory, for example, at least one disk memory.

The processor 901 may be a central processing unit (CPU for short), or an application specific integrated circuit (ASIC for short), or one or more integrated circuits configured to implement this embodiment of the present invention.

The processor 901 is configured to execute the program code in the memory 902 to implement the precoding information obtaining method in the foregoing embodiment.

An implementation process specifically includes the following:

The processor 901 is configured to determine a transformation quantity according to a steering vector of an antenna form and a departure-angle range;

the transmitter 904 is configured to send, to a terminal, information about the transformation quantity determined by the processor 901, where the information about the transformation quantity is used by the terminal to determine a PMI according to the information about the transformation quantity, a codebook used for obtaining channel information, and a pilot measurement result; and the receiver 905 is configured to receive the PMI reported by the terminal.

Some related technical features, for example, a steering vector of an antenna form, a departure-angle range, a transformation quantity, a PMI, a system information block, a transformation matrix, and the like, are similar or corresponding to some technical features related in the foregoing method embodiment. Descriptions are not repeated any longer in this embodiment.

Figure 10:
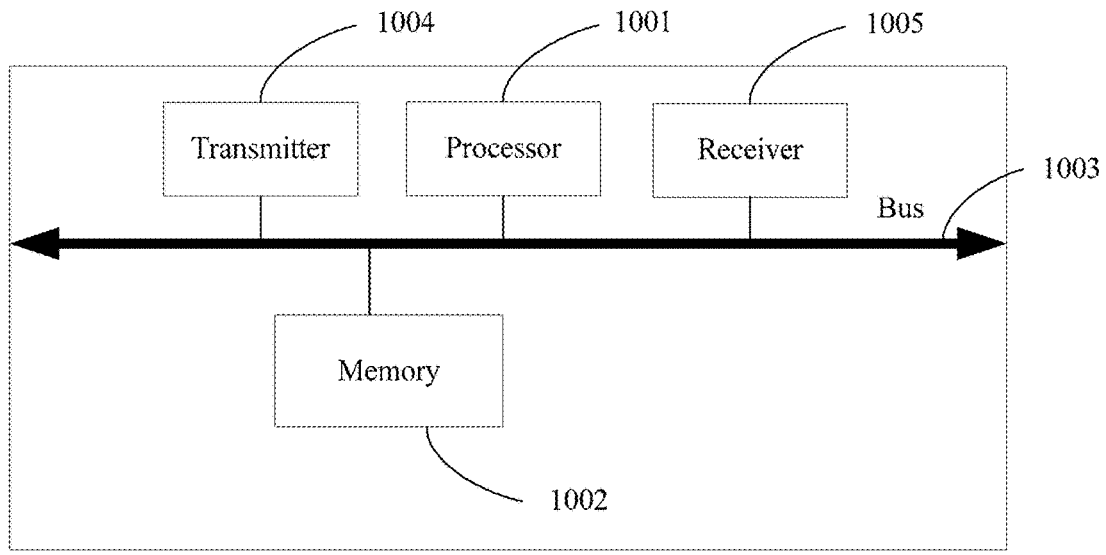
FIG. 10 is a schematic diagram of a precoding information feedback apparatus according to an embodiment of the present invention.

An embodiment of the present invention provides a precoding information feedback apparatus. Referring to FIG. 10, the apparatus includes: a processor 1001, a memory 1002, a transmitter 1004, a receiver 1005, and a bus 1003. The processor 1001, the memory 1002, the transmitter 1004, and the receiver 1005 are connected by using the bus 1003 to perform data transmission. The memory 1002 is configured to store data processed by the processor 1001.

The bus 1003 may be an industry standard architecture (ISA for short) bus, a peripheral component interconnect (PCI for short) bus, or an extended industry standard architecture (EISA for short) bus, or the like. This is not limited herein. The bus 1003 may be classified into an address bus, a data bus, a control bus, and the like. For ease of illustration, only one bold line is used in FIG. 10 to represent the bus. However, this does not mean that there is only one bus or only one type of bus.

The memory 1002 is configured to store data or executable program code, where the program code includes a computer operation instruction, and may be specifically an operating system, an application program, and the like. The memory 1002 may include a high-speed RAM memory, and may further include a non-volatile memory, for example, at least one disk memory.

The processor 1001 may be a central processing unit (CPU for short), or an application specific integrated circuit (ASIC for short), or one or more integrated circuits configured to implement this embodiment of the present invention.

The processor 1001 is configured to execute the program code in the memory 1002 to implement the precoding information feedback method in the foregoing embodiment.

An implementation process specifically includes the following:

The receiver 1005 is configured to receive information about a transformation quantity, where the transformation quantity is determined according to a steering vector of an antenna form and a departure-angle range;

the processor 1001 is configured to obtain a precoding matrix indicator PMI according to the information about the transformation quantity that is received by the receiver 1005, a codebook used for obtaining channel information, and a pilot measurement result; and the transmitter 1004 is configured to feed back the PMI obtained by the processor 1001 to a network node.

Some related technical features, for example, a steering vector of an antenna form, a departure-angle range, a transformation quantity, a PMI, a system information block, a transformation matrix, and the like, are similar or corresponding to some technical features related in the foregoing method embodiment. Descriptions are not repeated any longer in this embodiment.

Figure 11:
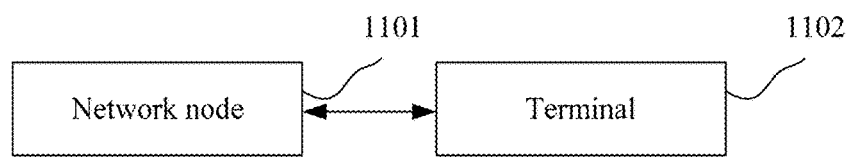
FIG. 11 is a schematic diagram of a precoding information obtaining system according to an embodiment of the present invention.

For a system embodiment, an embodiment of the present invention provides a precoding information obtaining system. As shown in FIG. 11, the system includes a network node 1101 and a terminal 1102 for performing the method provided in the embodiments of the present invention. Specifically, the system may include the apparatus shown in FIG. 7 and the apparatus shown in FIG. 8, or the system may include the apparatus shown in FIG. 9 and the apparatus shown in FIG. 10.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A precoding information obtaining method, comprising:
   determining a transformation matrix according to a steering vector of an antenna form and a departure-angle range;
   sending information about the transformation matrix to a terminal for determining a precoding matrix indicator (PMI) according to the information about the transformation matrix, a codebook for obtaining channel information, and a pilot measurement result, wherein sending the information about the transformation matrix comprises:
      sending a system information block to the terminal, wherein the system information block comprises the information about the transformation matrix, wherein the system information block comprises:
         a horizontal transformation matrix indicator for indicating whether the transformation matrix is in a horizontal direction,
         a horizontal transformation matrix dimension for indicating a dimension of the transformation matrix in the horizontal direction,
         a horizontal transformation matrix nonzero quantity for indicating a quantity of nonzero elements of the transformation matrix in the horizontal direction, and
         a horizontal transformation matrix element for indicating a value of the nonzero element of the transformation matrix in the horizontal direction; and
   receiving the PMI reported by the terminal.

2. The method according to claim 1, wherein:
   determining the transformation matrix according to the steering vector of the antenna form and the departure-angle range comprises:
      determining, according to the steering vector of the antenna form and the departure-angle range, a transformation matrix that maximizes an antenna gain.

3. The method according to claim 2, wherein:
   the transformation matrix is a transformation matrix T, and determining, according to the steering vector of the antenna form and the departure-angle range, the transformation matrix T that maximizes the antenna gain comprises:

obtaining T according to $$\hat{T} = \arg\max_{T} J(T);$$

wherein a value of T is $\hat{T}$, $\hat{T}$ is an estimate value of T, T satisfies an equation $T^H T = I$, $T^H$ is a Hermite matrix of T, and I is a unit matrix; and
obtaining J(T) according to $$J: C^{M \times M} \to R$$
$$J(T) = \sum_{\theta \in \theta_m} \max_{i \in \{1,2,\cdots N\}} |p_i^T T a(\theta)|^2;$$

wherein $J: C^{M \times M} \to R$ indicates that T in J(T) is an M×M complex matrix $C^{M \times M}$, J(T) is a real part of a value obtained according to the formula $$\sum_{\theta \in \theta_m} \max_{i \in \{1,2,\cdots N\}} |p_i^T T a(\theta)|^2,$$

M is a quantity of port numbers of a codebook used for obtaining channel information, $p_i \in [p_1, p_2, L\ p_N]$ is a vector in the codebook used for obtaining channel information, $[p_1, p_2, L\ p_N]$ is the codebook used for obtaining channel information, $p_i^T$ is transpose of $p_i$, i is any positive integer from 1 to N, N is a quantity of vectors in the codebook used for obtaining channel information, $a(\theta)$ is a steering vector of an antenna form, $\theta_m$ is a departure-angle range, and $\theta \in \theta_m$ in $a(\theta)$.

4. The method according to claim 1, wherein:
determining the transformation matrix according to the steering vector of the antenna form and the departure-angle range comprises:
determining, according to the steering vector of the antenna form and the departure-angle range, a transformation matrix that minimizes an antenna-gain fluctuation range.

5. The method according to claim 4, wherein:
the transformation matrix is a transformation matrix T, and determining, according to the steering vector of the antenna form and the departure-angle range, the transformation matrix T that minimizes the antenna-gain fluctuation range comprises:
obtaining T according to $$\hat{T} = \arg\max_{T} J(T);$$

wherein a value of T is $\hat{T}$, $\hat{T}$ is an estimate value of T, T satisfies an equation $T^H T = I$, $T^H$ is a Hermite matrix of T, and I is a unit matrix; and
obtaining J(T) according to $$J: C^{M \times M} \to R$$
$$J(T) = \sum_{\theta \in \theta_m} \max_{i \in \{1,2,\cdots N\}} |p_i^T T a(\theta)|^2;$$

wherein $J: C^{M \times M} \to R$ indicates that T in J(T) is an M×M complex matrix $C^{M \times M}$, J(T) is a real part of a value obtained according to the formula $$\sum_{\theta \in \theta_m} \max_{i \in \{1,2,\cdots N\}} |p_i^T T a(\theta)|^2,$$

M is a quantity of port numbers of a codebook used for obtaining channel information, $p_i \in [p_1, p_2, L\ p_N]$ is a vector in the codebook used for obtaining channel information, $[p_1, p_2, L\ p_N]$ is the codebook used for obtaining channel information, $p_i^T$ is transpose of $p_i$, i is any positive integer from 1 to N, N is a quantity of vectors in the codebook used for obtaining channel information, $a(\theta)$ is a steering vector of an antenna form, $\theta_m$ is a departure-angle range, and $\theta \in \theta_m$ in $a(\theta)$.

6. A precoding information obtaining method, comprising:
determining a transformation matrix according to a steering vector of an antenna form and a departure-angle range;
sending information about the transformation matrix to a terminal for determining a precoding matrix indicator (PMI) according to the information about the transformation matrix, a codebook for obtaining channel information, and a pilot measurement result, wherein sending the information about the transformation matrix comprises:
sending a system information block to the terminal, wherein the system information block comprises the information about the transformation matrix, wherein the system information block comprises:
a vertical transformation matrix indicator for indicating whether the transformation matrix is in a vertical direction,
a vertical transformation matrix dimension for indicating a dimension of the transformation matrix in the vertical direction,
vertical transformation matrix nonzero quantity for indicating a quantity of nonzero elements of the transformation matrix in the vertical direction, and
a vertical transformation matrix element for indicating a value of the nonzero element of the transformation matrix in the vertical direction; and
receiving the PMI reported by the terminal.

7. A precoding information obtaining apparatus, comprising:
a processor;
a memory;
a transmitter;
a receiver; and
a bus; wherein:
the processor, the memory, the transmitter, and the receiver are connected by using the bus to perform data transmission, and the memory is configured to store data processed by the processor;
the processor is configured to determine a transformation matrix according to a steering vector of an antenna form and a departure-angle range;
the transmitter is configured to:
send, to a terminal, information about the transformation matrix determined by the processor for determining a precoding matrix indicator (PMI) according to the information about the transformation matrix, a codebook used for obtaining channel information, and a pilot measurement result, and send a system information block to the terminal, wherein the system information block comprises the information about the transformation matrix, wherein the system information block comprises:

a horizontal transformation matrix indicator for indicating whether the transformation matrix is in a horizontal direction;

a horizontal transformation matrix dimension for indicating a dimension of the transformation matrix in the horizontal direction;

a horizontal transformation matrix nonzero quantity for indicating a quantity of nonzero elements of the transformation matrix in the horizontal direction; and a horizontal transformation matrix element for indicating a value of the nonzero element of the transformation matrix in the horizontal direction; and the receiver is configured to receive the PMI reported by the terminal.

8. The apparatus according to claim 7, wherein the processor is configured to determine, according to the steering vector of the antenna form and the departure-angle range, a transformation matrix that maximizes an antenna gain.

9. The apparatus according to claim 8, wherein:
the transformation matrix is a transformation matrix T, and the processor is configured to:
obtain T according to $$\hat{T} = \underset{T}{\operatorname{argmax}}\, J(T);$$

wherein a value of T is $\hat{T}$, $\hat{T}$ is an estimate value of T, T satisfies an equation $T^H T = I$, $T^H$ is a Hermite matrix of T, and I is a unit matrix; and
obtain J(T) according to $$J: C^{M \times M} \to R$$

$$J(T) = \sum_{\theta \in \theta_m} \max_{i \in \{1,2,\cdots N\}} |p_i^T T a(\theta)|^2;$$

wherein $J: C^{M \times M} \to R$ indicates that T in J(T) is an M×M complex matrix $C^{M \times M}$, J(T) is a real part of a value obtained according to the formula $$\sum_{\theta \in \theta_m} \max_{i \in \{1,2,\cdots N\}} |p_i^T T a(\theta)|^2,$$

M is a quantity of port numbers of a codebook used for obtaining channel information, $p_i \in [p_1, p_2, L\ p_N]$ is a vector in the codebook used for obtaining channel information, $[p_1, p_2, L\ p_N]$ is the codebook used for obtaining channel information, $p_i^T$ is transpose of $p_i$, i is any positive integer from 1 to N, N is a quantity of vectors in the codebook used for obtaining channel information, $a(\theta)$ is a steering vector of an antenna form, $\theta_m$ is a departure-angle range, and $\theta \in \theta_m$ in $a(\theta)$.

10. The apparatus according to claim 7, wherein the processor is configured to determine, according to the steering vector of the antenna form and the departure-angle range, a transformation matrix that minimizes an antenna-gain fluctuation range.

11. The apparatus according to claim 10, wherein:
the transformation matrix is a transformation matrix T, and the processor is configured to:
obtain T according to $$\hat{T} = \underset{T}{\operatorname{argmax}}\, J(T);$$

wherein a value of T is $\hat{T}$, $\hat{T}$ is an estimate value of T, T satisfies an equation $T^H T = I$, $T^H$ is a Hermite matrix of T, and I is a unit matrix; and
obtain J(T) according to $$J: C^{M \times M} \to R$$

$$J(T) = \min \left| \frac{\max_{\theta \in \theta_m}\left(\max_{i \in \{1,2,\cdots N\}} |p_i^T T a(\theta)|^2\right)}{\min_{\theta \in \theta_m}\left(\max_{i \in \{1,2,\cdots N\}} |p_i^T T a(\theta)|^2\right)} \right|;$$

wherein $J: C^{M \times M} \to R$ indicates that T in J(T) is an M×M complex matrix $C^{M \times M}$, J(T) is a real part of a value obtained according to a formula $$\sum_{\theta \in \theta_m} \max_{i \in \{1,2,\cdots N\}} |p_i^T T a(\theta)|^2,$$

M is a quantity of port numbers of a codebook used for obtaining channel information, $p_i \in [p_1, p_2, L\ p_N]$ is a vector in the codebook used for obtaining channel information, $[p_1, p_2, L\ p_N]$ is the codebook used for obtaining channel information, $p_i^T$ is transpose of $p_i$, i is any positive integer from 1 to N, N is a quantity of vectors in the codebook used for obtaining channel information, $a(\theta)$ is a steering vector of an antenna form, $\theta_m$ is a departure-angle range, and $\theta \in \theta_m$ in $a(\theta)$.

12. A precoding information obtaining apparatus, comprising:
a processor;
a memory;
a transmitter;
a receiver; and
a bus; wherein:
the processor, the memory, the transmitter, and the receiver are connected by using the bus to perform data transmission, and the memory is configured to store data processed by the processor;
the processor is configured to determine a transformation matrix according to a steering vector of an antenna form and a departure-angle range;
the transmitter is configured to:
send, to a terminal, information about the transformation matrix determined by the processor for determining a precoding matrix indicator (PMI) according to the information about the transformation matrix, a codebook used for obtaining channel information, and a pilot measurement result, and send a system information block to the terminal, wherein the system information block comprises the information about the transformation matrix, wherein the system information block comprises:
- a vertical transformation matrix indicator for indicating whether the transformation matrix is in a vertical direction;
- a vertical transformation matrix dimension for indicating a dimension of the transformation matrix in the vertical direction;
- a vertical transformation matrix nonzero quantity for indicating a quantity of nonzero elements of the transformation matrix in the vertical direction; and
- a vertical transformation matrix element for indicating a value of the nonzero element of the transformation matrix in the vertical direction; and the receiver is configured to receive the PMI reported by the terminal.

* * * * *